(12) United States Patent
Gibbs et al.

(10) Patent No.: US 11,509,164 B2
(45) Date of Patent: Nov. 22, 2022

(54) SYSTEMS AND METHODS FOR SOLAR ENERGY MANAGEMENT

(71) Applicant: Solar SEED LLC, Montclair, NJ (US)

(72) Inventors: R. David Gibbs, Montclair, NJ (US); C. James Bonanno, Jr., Worthington, OH (US)

(73) Assignee: Solar Seed LLC, Monclair, NJ (US)

( * ) Notice: Subject to any disclaimer, the term of this patent is extended or adjusted under 35 U.S.C. 154(b) by 244 days.

(21) Appl. No.: 17/029,497

(22) Filed: Sep. 23, 2020

(65) Prior Publication Data
US 2021/0091593 A1 Mar. 25, 2021

Related U.S. Application Data

(60) Provisional application No. 62/904,003, filed on Sep. 23, 2019.

(51) Int. Cl.
*H02J 7/35* (2006.01)
*H02J 7/00* (2006.01)
*H02J 3/38* (2006.01)

(52) U.S. Cl.
CPC .............. *H02J 7/35* (2013.01); *H02J 3/381* (2013.01); *H02J 7/0048* (2020.01); *H02J 7/007182* (2020.01); *H02J 2207/20* (2020.01); *H02J 2300/26* (2020.01)

(58) Field of Classification Search
CPC ...... H02J 7/35; H02J 7/0048; H02J 7/007182; H02J 3/381; H02J 2207/20; H02J 2300/26; H02J 7/00; H02J 3/38
See application file for complete search history.

(56) References Cited

U.S. PATENT DOCUMENTS

2016/0219664 A1   7/2016  Ellenberger

FOREIGN PATENT DOCUMENTS

CN         108565959 B       8/2020

OTHER PUBLICATIONS

Young, Lee; International Search Report and Written Opinion of the International Searching Authority, issued in International Patent Application No. PCT/US2020/052166; dated Feb. 1, 2021; 13 pages.

*Primary Examiner* — Robert L Deberadinis
(74) *Attorney, Agent, or Firm* — Ulmer & Berne LLP; Vance V. VanDrake, III; Lucas Victor Haugh

(57) ABSTRACT

Systems and methods are provided for solar energy management that can charge a battery from a solar panel as well as operate without a battery, using the same equipment. This multi-modal functionality provides the ability to incrementally increase capacity and extend the availability of electricity from daytime-only to a continuous supply irrespective of solar conditions.

20 Claims, 8 Drawing Sheets

SYSTEMS AND METHODS FOR SOLAR ENERGY MANAGEMENT

CROSS-REFERENCE TO RELATED APPLICATION

This application claims priority to U.S. Application Ser. No. 62/904,003, filed Sep. 23, 2019, entitled SYSTEMS AND METHODS FOR SOLAR ENERGY MANAGEMENTS, the disclosure of which is incorporated herein by reference in its entirety.

BACKGROUND

Globally, almost 1 billion people live without access to electricity, and another billion have only unreliable access to electricity. These underserved communities living "beyond the grid" are typically among the world's most vulnerable and must rely on dangerous, polluting fuels like kerosene and diesel for daily energy needs. Most solar generators and Off-Grid Solar (OGS) products offered to consumers are unable to meet the needs of the end-user and lack the ability to increase capacity or work interchangeably with other components. Many solutions being deployed today include proprietary parts or are manufactured such that they are difficult to repair. Further, because many products are offered turnkey kits, they are often incorrectly sized for the operational conditions resulting in the battery continually functioning in a state of deficit, which eventually leading to system failure. This result not only leaves the consumer without power, but can also solidifies to the end user a common misconception that solar energy is not a viable option.

With regard to equipment used to covert solar energy to useable electricity, charge controllers are a type of product are widely used in solar power systems and power conversion. The primary purpose of a charge controller is to pull a maximum amount of power from a solar panel or solar cell at any instant in time. A charge controller, sometimes referred to as a charge regulator, generally functions as a voltage and/or current regulator to keep batteries from overcharging by regulating the voltage and current coming from the solar panels and going to the battery. One approach for regulating the charging process is through Maximum Power Point Tracking (MPPT.) The MPPT algorithm charges a battery at a fixed voltage level during this operation. Other types of products typically used with a solar cell are a "PWM Converter" or "DC/DC Converter." These types of converters receive an input voltage from a solar cell and perform a DC/DC conversion to produce another voltage as an output. While a user can apply the output to a load, a PWM Converter does not charge a battery.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
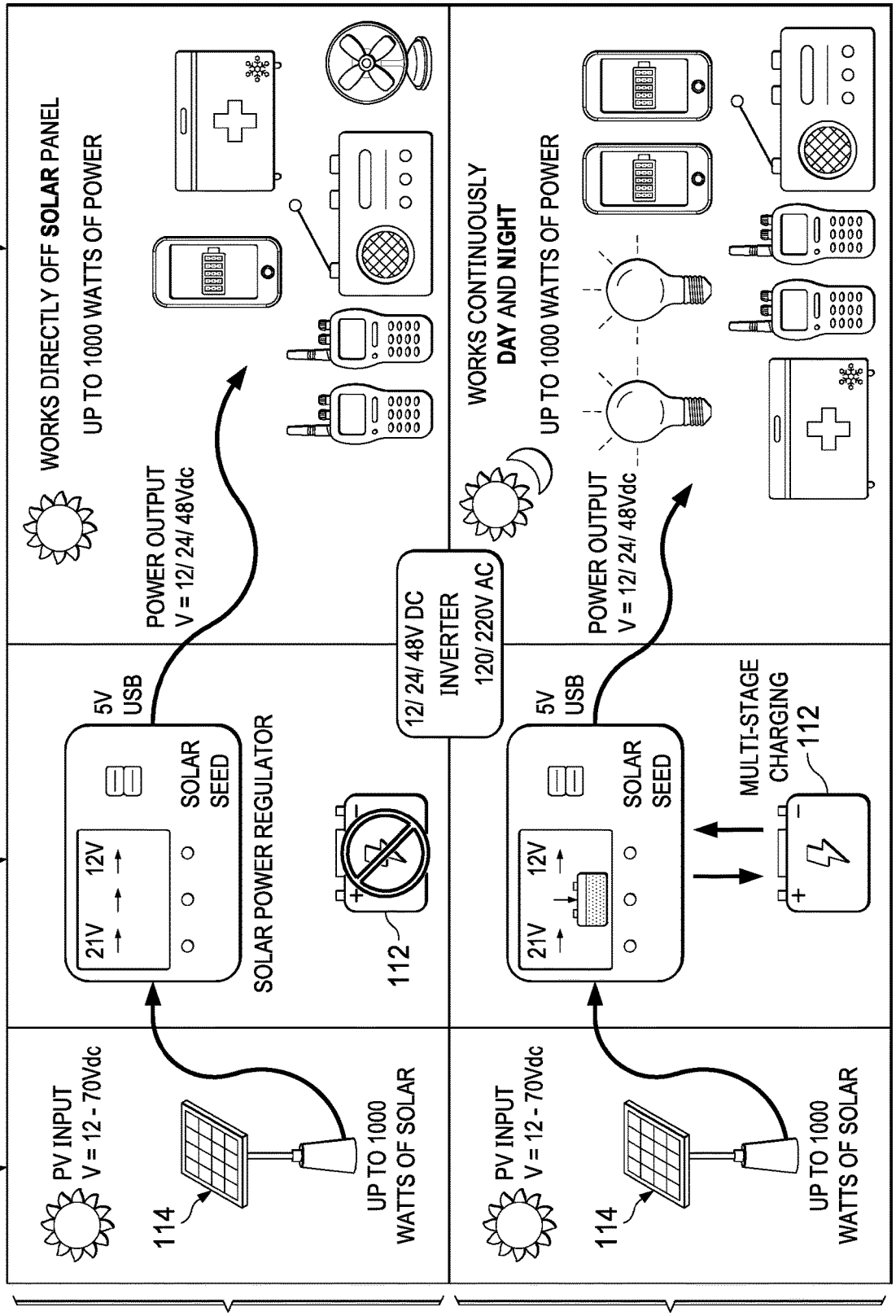
FIG. 1 schematically depicts an example conversion of solar energy inputs to various outputs by a solar energy management system, with and without battery storage, in accordance with various embodiments.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-7 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identification of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented, but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that, although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

As described in more detail below, the present disclosure generally relates to power electronic systems, digital controls, and distributed energy conversion. The systems and methods described herein can charge a battery from a solar panel as well as operate without a battery, using the same equipment. Solar energy management systems described herein uniquely can operate both as a photovoltaic (PV) panel power regulator without battery storage as well as a charge controller with battery storage. This multi-modal functionality gives the solar energy management system the ability to incrementally increase capacity and extend the availability of electricity from daytime-only to a continuous supply irrespective of solar conditions. This functionality also allows the system to adapt to individual or situational needs.

Solar energy management systems in accordance with the present disclosure can provide one or more of the following benefits. Example solar energy management systems described herein can produce usable DC and AC electricity from the energy generated by photovoltaic (PV) modules of varying voltages and wattages and can also operate with or without local energy storage. Deploying solar energy management systems without a battery, can allow the cost of the system to decrease dramatically and energy can be used when being generated by the sun. Thus, the solar energy management systems described herein can provide enough electricity for basic or critical functions, such as device charging, refrigeration, low-power telecommunication equipment (WiFi mesh or radio), water pumps, etc., in situations when batteries fail or are unavailable.

The systems of the present disclosure can harness photovoltaic energy from a variety of solar panel types (such as, monocrystalline, polycrystalline, amorphous silicon, thin film, CIGs, and so forth) to produce regulated output voltage and current. In some embodiments, the output voltage generated by the solar energy management system is at 12V DC, 24V DC, or 48V DC with an auxiliary 5 V USB output. Such output(s) can be provided with or without battery/energy storage device. Furthermore, with the addition of a grid-interactive, grid-supporting, grid-forming, or off-grid inverter to the system, can include outputs from 110 to 600 VAC, single phase or three phase at predefined frequencies. If a temporary obstruction like a cloud shades sunlight causing PV panel power to drop, the solar energy management systems can automatically disconnect loads and reconnect when power is restored and stable with programmable disconnect and reconnect set-points.

In some embodiments, solar energy management systems are scalable to generate up to 2400 Watts of power and can be stacked in parallel to provide up to 9600 Watts in generation capacity, with or without an attached battery. Functioning without a battery can be beneficial, as batteries are typically the weakest link of an off-grid energy system and can have relatively short lifespans compared to other components of the energy systems. As the solar energy management systems described herein are operational without a battery, such systems can function as a safety net for off-grid systems, as they can continue to generate energy when solar energy is available, even if the associated storage device fails.

Moreover, as a solar energy management system with PV module(s) can provide power for a user, without requiring the user to procure a battery, overall startup costs for the user can be reduced. Over time, the user can expand system, add energy storage, and increase capacity at any time. Use of the solar energy management system also can beneficially attune the end-user to energy positive habits, which can include the efficient and effective productive use of solar energy, when it is available. Based on these habits, the user may be potentially influenced to select a smaller battery, for example, to extend power usability. In some embodiments, the electronics can be assembled by hand to allow for "field" repair, which may be particularly useful for first responders and relief workers during post-disaster and emergency situations. This configuration can also support 'ethical electronics repair, reuse, repurposing and recycling' to benefit local various repair economies in developing countries. As solar energy management systems can be repairable, the amount of Electronic Waste (e-waste), entering the waste stream can beneficially be reduced. Thus, solar energy management systems of the present disclosure can beneficially address usage patterns and conservation, while seeking to minimize total cost of ownership.

FIG. 1 schematically depicts an example conversion of solar energy inputs 102 to various outputs 106 by a solar energy management system 104 in accordance with various embodiments. A first operational condition 108 schematically illustrates the use of the solar energy management system 104 without a battery 112 and a second operational condition 110 schematically illustrates the use of the solar energy management system 104 with a battery 112. As shown, during the first operational condition 108, the solar energy management system 104 works directly from the connected PV panel 114. During the second operational condition 110, the solar energy management system 104 is also able to work during conditions with adequate solar power (i.e., daytime) and conditions without adequate solar power (i.e., nighttime), due to the presence of the battery 212.

The solar energy management system 104 can perform a self-introspection routine to determine the current operational conditions. In this regard, the solar energy management system 104 can determine whether a PV panel 114 is supplying an input voltage, whether a battery 112 (or other energy storage device) is attached and supplying an input voltage, or whether both a PV panel 114 and a battery 112 are attached. Based on this determination, the solar energy management system 104 determines whether to operate as a charge controller only, a PWM DC/DC converter only, or a combination of the two.

Solar energy management system in accordance with various embodiments of the present disclosure can be rated at 2 kW of power, with either a 48V DC, 24V DC, or 12V DC output, for example. Additionally, the system can accept batteries of the same voltage. In some implementations, the solar energy management system can have a user defined voltage out that exceeds 48V DC. The programmability functionality can allow for atypical battery voltages up to 400V DC, for example, that typically can be found particularly with battery technologies such as Lithium, for example. Furthermore, some example solar energy management systems limit the output to 80V DC to correspond with the National Electric Code (NEC) regarding Power Optimizers and rapid shut-down requirements for many photovoltaic systems. Moreover, in accordance with various embodiments, solar energy management systems can have the ability to control the charge voltage and current for two different energy storage devices.

As described in more detail below, the solar energy management system can include a control power supply that enables the system to be powered up by either a battery or a PV panel, or both. This dual-power up functionality is generally referred to herein as self-introspection, as the system can determine whether a PV panel is attached, a battery is attached, or both are attached. As the self-inspection routine is enabled by the standalone control power supply, this control power supply is configured to be powered by either a PV panel or a battery, in order to handle various operational scenarios. The self-introspection routine can run constantly, or at least periodically. As such, for example, if a battery is attached subsequent to the initial power-up of the system, the self-introspection routine can detect the battery and change operational mode, as may be required.

Figure 2:
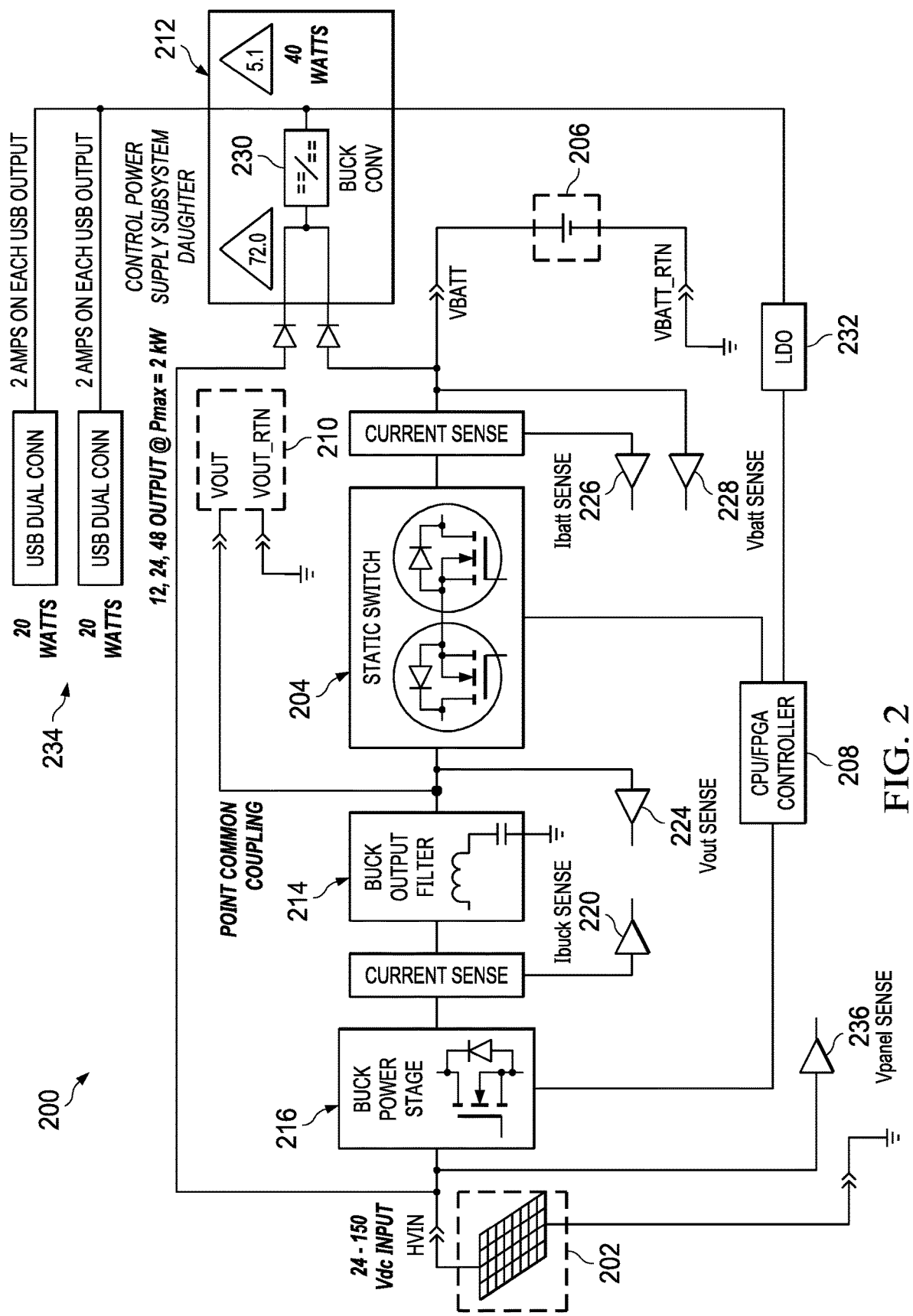
FIG. 2 an example embodiment of a solar energy management system is depicted.

Referring now to FIG. 2, one example embodiment of a solar energy management system 200 is shown. The solar energy management system 200 is shown electrically coupled to a photovoltaic (PV) panel(s) 202 and battery storage 206. The PV panel(s) 202 can be any suitable panel delivering an input voltage up to 100V DC; in some embodiments up to 600V DC, or higher. However, it is to be appreciated, that in some operational conditions the PV panel may be disconnected, or otherwise not producing voltage. Additionally, battery storage 206 may or may not be present.

The solar energy management system 200 can operate as either a charge controller or a PWM converter. The solar energy management system 200 can execute decisioning to allow the solar energy management system 200 to determine whether the system is to operate as a charge controller or as a PWM converter. The solar energy management system 200 can comprise a control unit 208, a buck regulator 216, a first current sensor 220, an output filter 214, a first voltage sensor 224, a switch 204, a second current sensor 226, a second voltage sensor 228, and a third voltage sensor 236. The solar energy management system 200 can also include a buck converter 230, a low-dropout regulator 232, and a plurality of outlets 234. The buck converter 230 can electrically connect a PV panel 202 and/or the battery 206 to the plurality of outlets 234 and the low-dropout regulator 232. The buck converter 230 can be supplied power from the connected PV panel 202 or a battery 206 and output a reduced voltage to the plurality of outlets 234 and the low-dropout regulator 232. As shown, the buck converter 230 generally serves as a stand along control power supply. The solar energy management system 200 can allow for three modes of operations, providing operation as a combination charge and Pulse Width Modulation (PWM) controller, operation as a charge controller, or operation as a PWM controller, as described in more detail below.

The buck regulator 216 can ensure the voltage received from the PV panel 202 can be stepped down. The buck regulator 216 can be electrically connected to the control unit 208 and the first current sensor 220. The first current sensor 220 can be operatively coupled to the control unit 208 and can send information to the control unit 208 regarding a level of current supplied by PV panel 202. The third voltage sensor 236 can also be operatively coupled to the control unit 208 and can send information to the control unit 208 regarding the voltage level supplied by PV panel 202. The first current sensor 220 can additionally electrically connect the buck regulator 216 to the output filter 214. The output filter 214 can be electrically connected to the first voltage sensor 224 at a point common coupling. The first voltage sensor 224 can send information to the control unit 208 about the voltage level at the point common coupling. The switch 204 can also be electrically connected to the point common coupling, with the switch 204 controlled by the control unit 208 allowing the control unit 208 to switch between modes by opening or closing the switch.

The second current sensor 226 and the second voltage sensor 228 can be connected to the switch 204, as shown, each of which provide information to the control unit 208. The second current sensor 226 provides information to the control unit 208 regarding any current applied by the 206 battery. The second voltage sensor 228 provides information to the control unit 208 regarding any voltage supplied by the 206 battery.

Table 1, below, provides operational parameters for the example solar energy management system 200 in accordance with the present disclosure:

TABLE 1

| Parameter | Rating | Description |
| --- | --- | --- |
| $V_{in}$ | 0-130 Volts | PV input voltage |
| $V_{out}$ | 0-80 Volts | Output voltage in Buck regulator mode |
| $I_{out}$ | 40 Amps | $V_{out}$ = 48 Volts |
|  | 50 Amps | $V_{out}$ = 24 Volts |
|  | 60 Amps | $V_{out}$ = 12 Volts |
| $P_{rated}$ | 2 Kilowatts | Full rated power |
| Auxiliary Power | 40 Watts | USB 2.0 Connectors (x2) |

The solar energy management system 200 can operates as a PWM controller when a battery 206 is not attached. The solar energy management system 200 can recognize that no battery is present via any suitable type of sensing, such as indirect sensing or direct sensing. For instance, the solar energy management system 200 can utilize a model-based observer in firmware or as a direct measurement with voltage and or current feedback. This operational mode is referred to herein as "Mode 1," and schematically shown in FIG. 3A. FIG. 3B schematically illustrates this operational mode providing a DC output and FIG. 3C schematically illustrates this operational mode providing a DC output and an AC output.

Figure 3A:
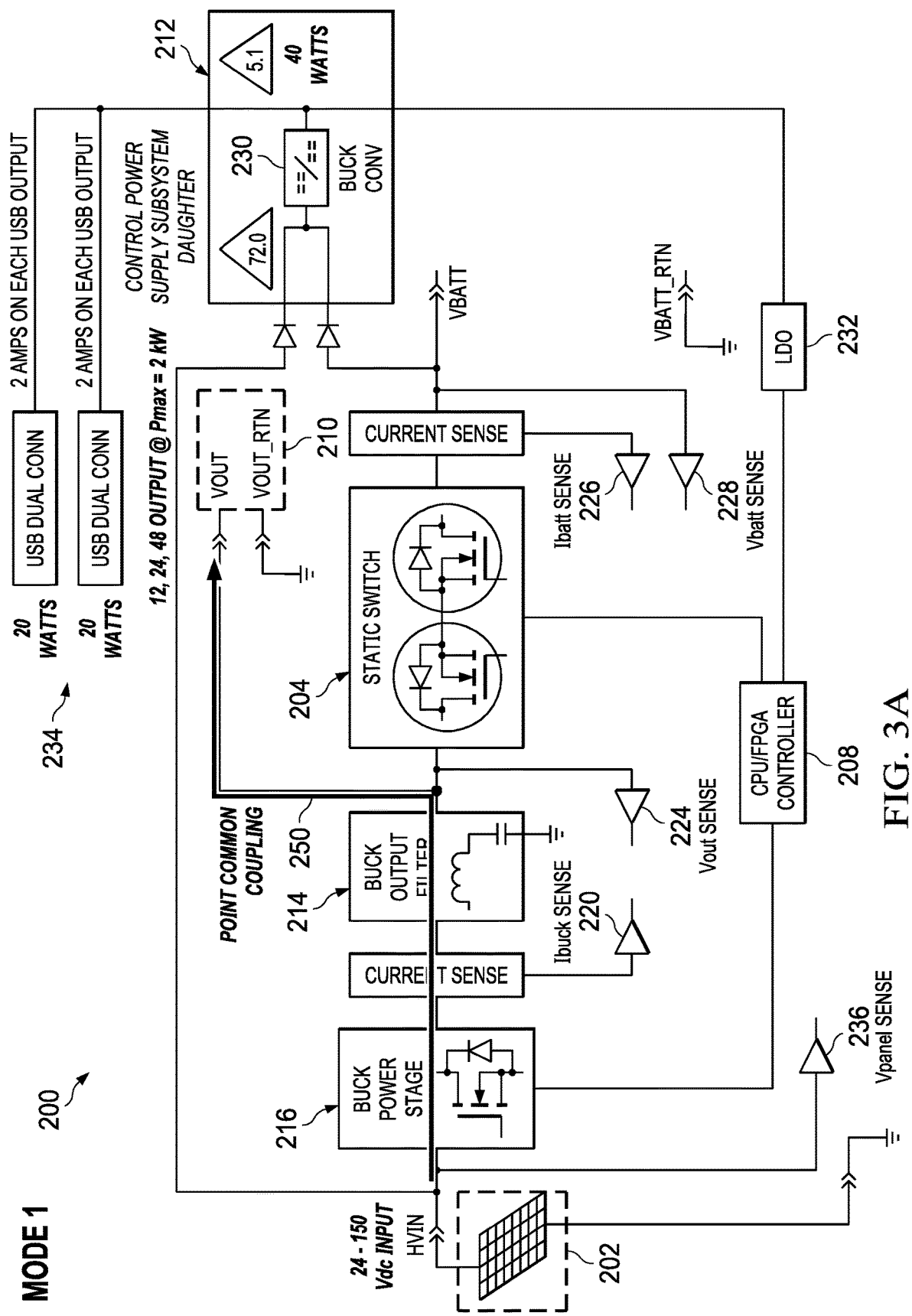
FIGS. 3A-3C schematically illustrate a first operational modes of the solar management system of FIG. 2.
Figure 3B:
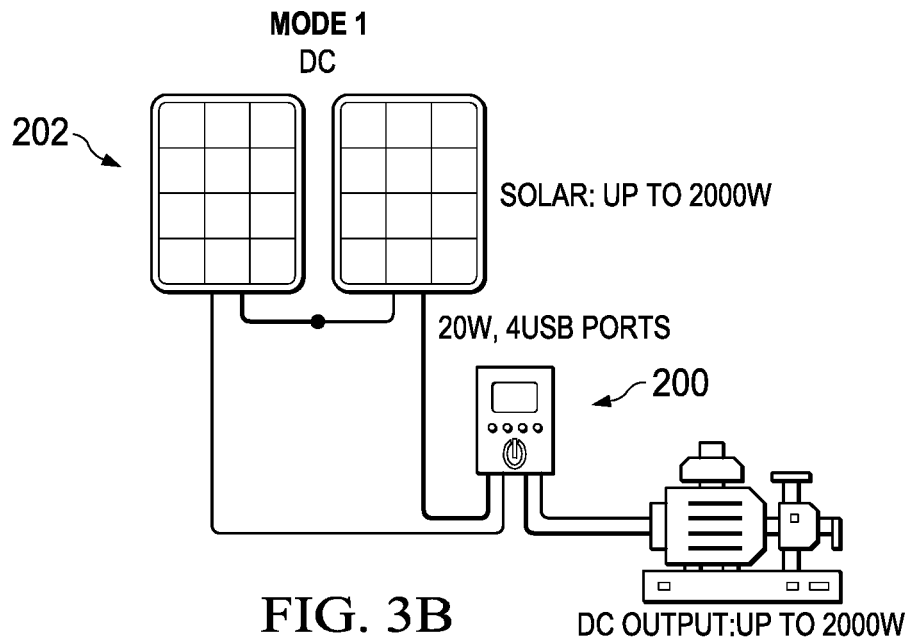
Figure 3C:
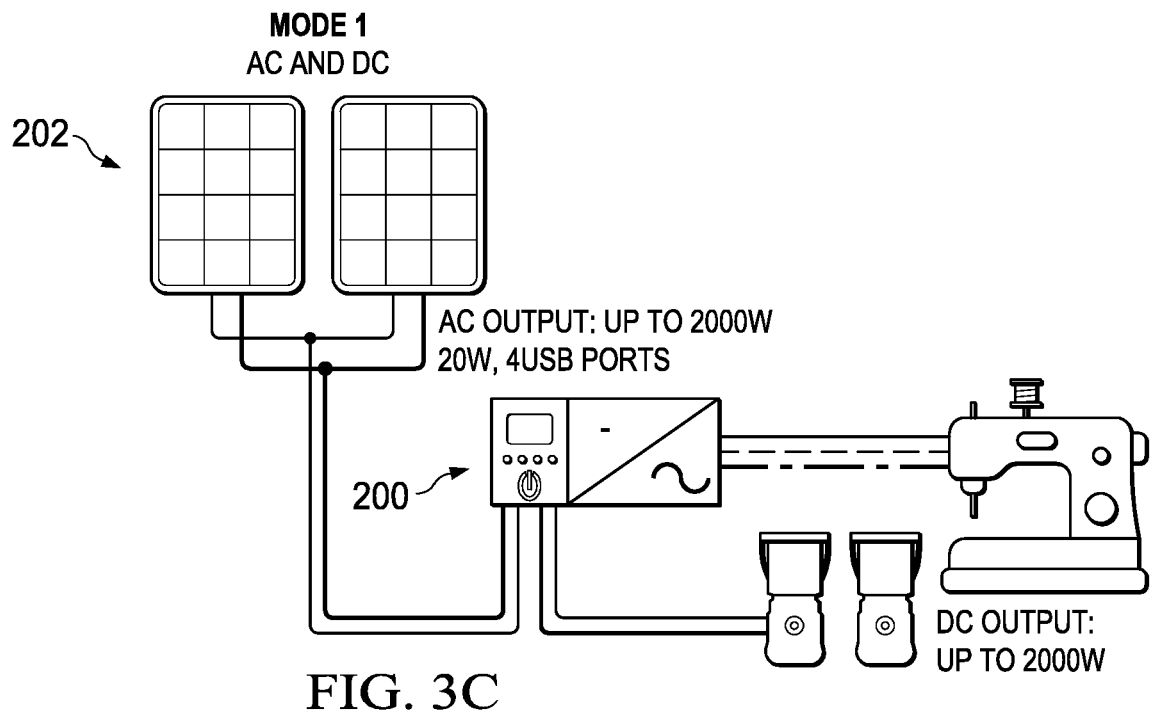

As shown in FIG. 3A, the buck regulator 216 receives a voltage from the PV panel 202 and outputs a lower voltage to the first current sensor 220. The first current sensor 220 then sends to the control unit 208 information regarding a current level provided by the buck regulator 216. Once the control unit 208 receives information from the first current sensor 220, the control unit 208 can set the switch 204 to an open state, allowing voltage outputted by the buck regulator 216 to flow through the first current sensor 110 and the output filter 214 to a load attached to the output terminals 210, as shown with the arrow 250. Thus, in the mode of operation depicted in FIG. 3A, the solar energy management system 200 operates in Buck mode, creating a lower output voltage versus the input voltage.

Next, the solar energy management system 200 can operate as a combined charge controller and a PWM DC/DC converter, where the output voltage at the output terminals 210 is set to a user determined level, such as 12V DC, 24V DC, or 48V DC, with the battery 206 supplying the power. In some embodiments, the user can define an output that his higher than 48V DC. A control algorithm of the solar energy management system 200 can utilize a MPPT tracking algorithm to pull optimal amounts of power out of the PV panel 202 that is attached to the input. Simultaneously, the output voltage at the output terminals 210 can be is maintained to the level set by the user. This operational mode is referred to herein as "Mode 2," and schematically shown in FIG. 4A. FIG. 4B schematically illustrates this operational mode providing a DC output and FIG. 4C schematically illustrates this operational mode providing a DC output and an AC output.

Figure 4A:
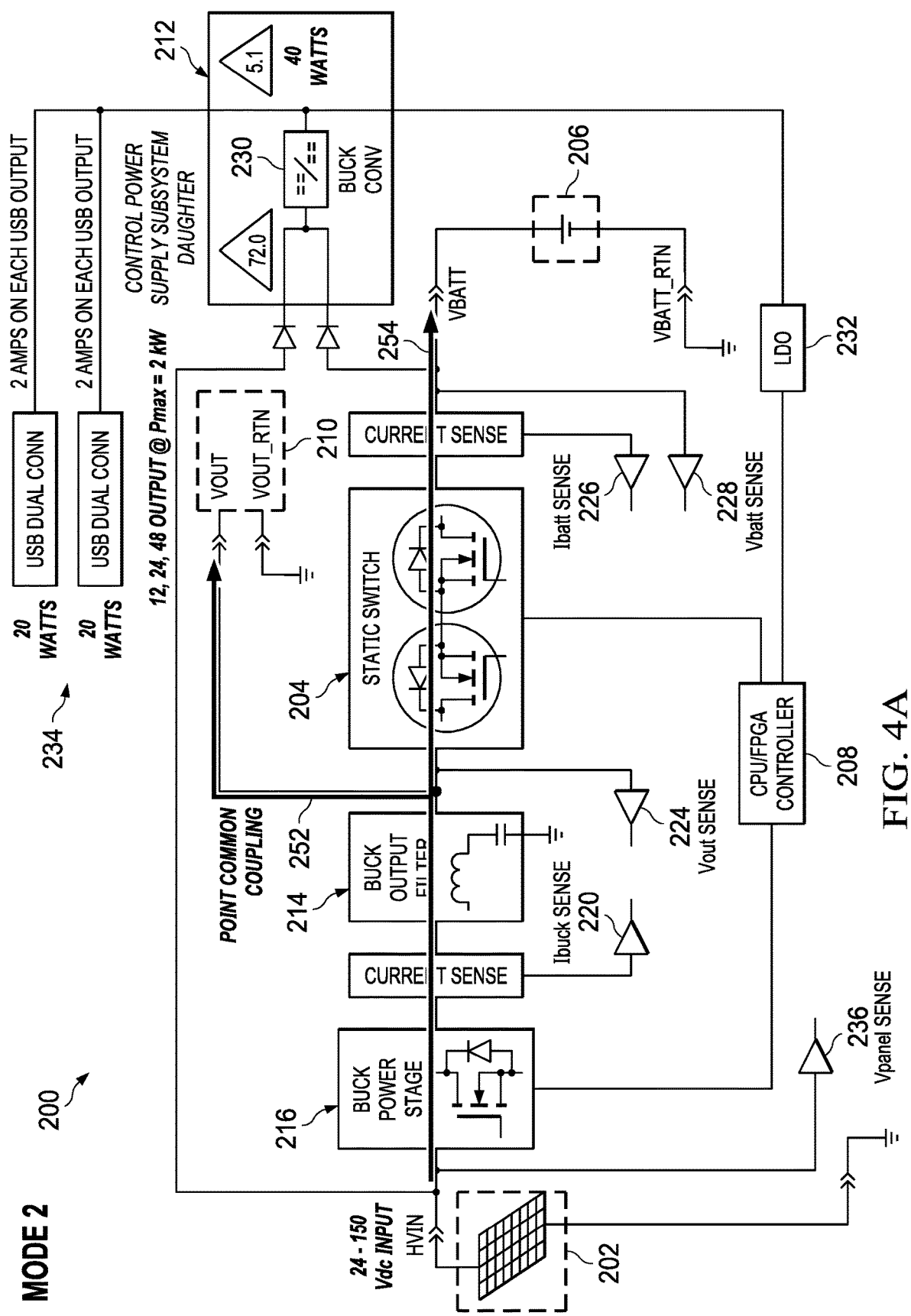
FIGS. 4A-4C schematically illustrate a second operational modes of the solar management system of FIG. 2.
Figure 4B:
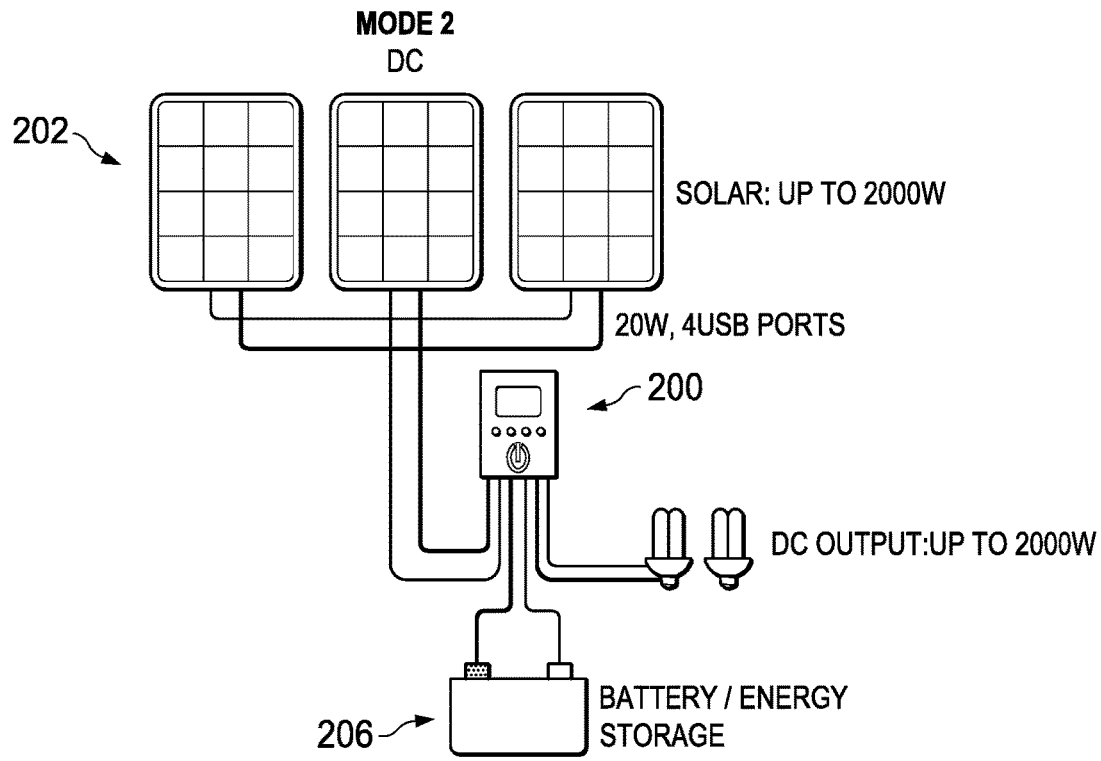
Figure 4C:
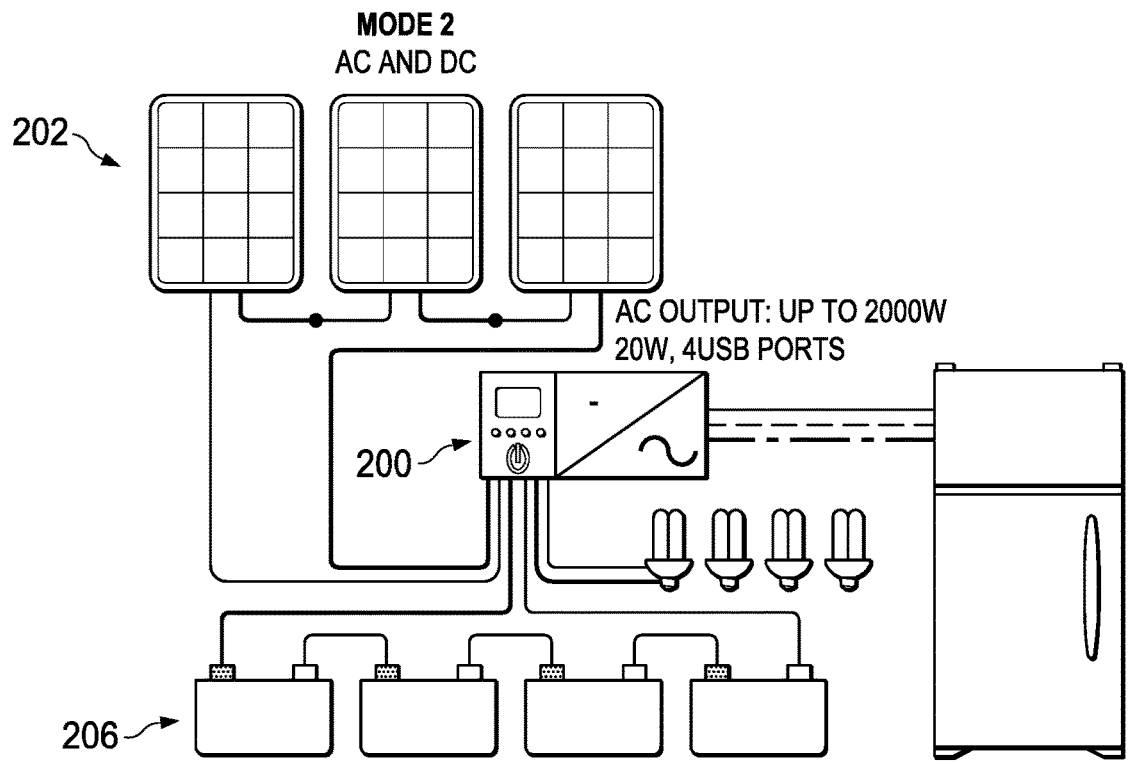

As shown in FIG. 4A, the buck regulator 216 receives a voltage from the PV panel 202 and outputs a lower voltage to the first current sensor 220. The first current sensor 220 then sends information to the control unit 208 regarding a level of current provided by the buck regulator 216. Once the control unit 208 receives information from the first current sensor 220, the control unit 208 can set the switch 204 to a closed state, allowing a voltage outputted by the buck regulator 216 to flow through the first current sensor 220 and the output filter 214 to both a load attached to the output terminals 210 and a battery 206 that is electrically connected to the solar energy management system 200, as shown with the arrows 252 and 254.

The solar energy management system 200 can also operate as charge controller when the battery 206 is present. In this operational condition, the PV panel 202 is either not present or is not producing sufficient voltage levels (i.e. low/no light conditions). When the battery 206 is present, a switch 204 of the solar energy management system 200 can be transitioned to a conductive state (i.e., "closed") by the control unit 208. When the switch 204 is closed, a power transfer from the battery 206 to a load attached at output terminals 210 is facilitated. This operational mode is referred to herein as "Mode 3," and schematically shown in FIG. 5.

Figure 5:
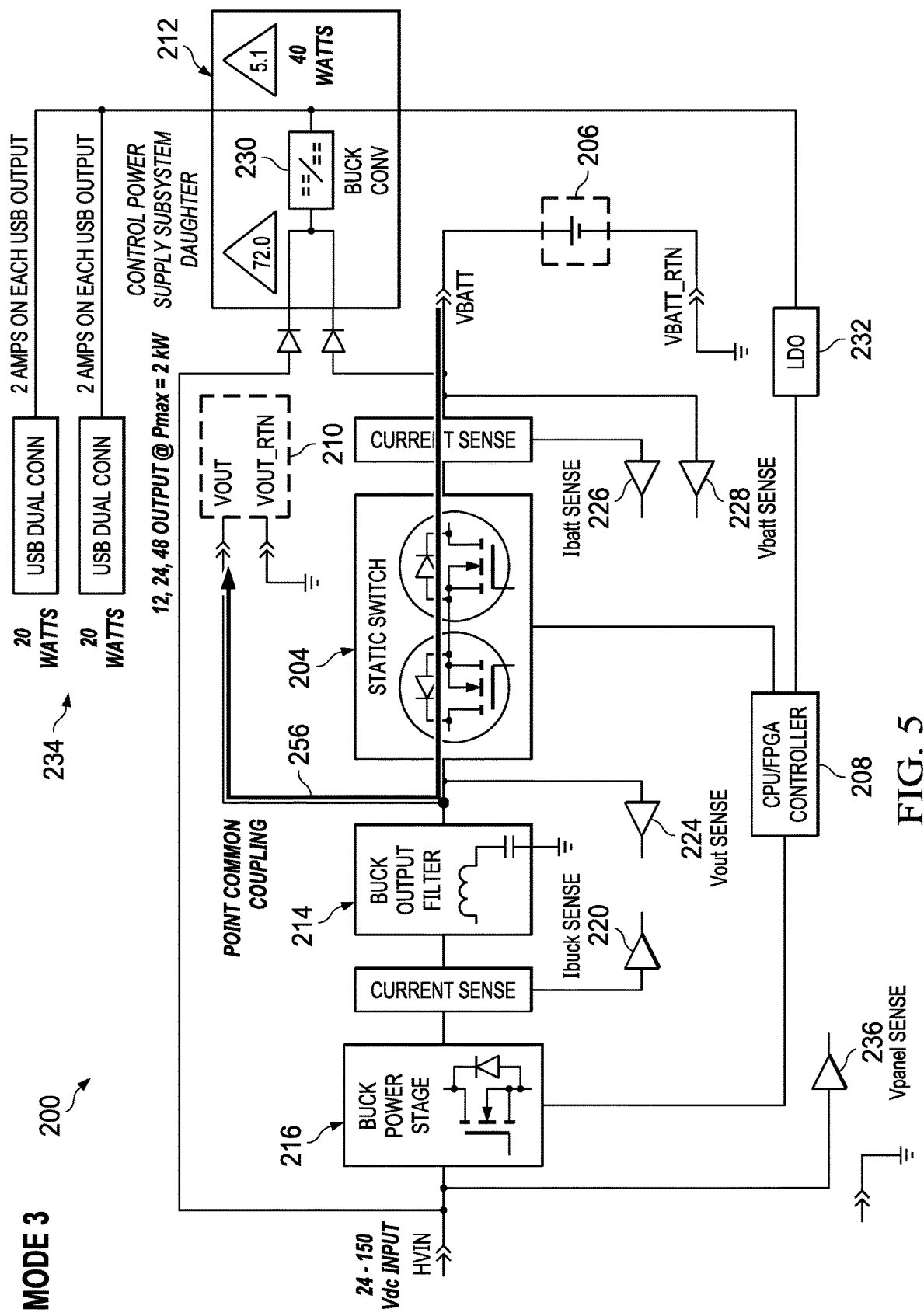
FIG. 5 schematically illustrates a third operational modes of the solar management system of FIG. 2.

Referring the mode of operation depicted in FIG. 5, in this mode of operation the battery 206 supplies power to the load via output terminals 210 in an unregulated fashion. Thus, whatever the voltage the batter 206 is producing will be present at the output terminals 210 and usable by the user. The switch 204 provides overload current protection and undervoltage lockout protection. As such, if the battery voltage decays to an unacceptable low value as monitor by the second voltage sensor 228 that may damage the battery, the switch 204 is opened and the battery 206 is disconnected. Likewise, if the current is excessive, as monitored by the second current sensor 226 indicating a short circuit or overload condition, the switch 204 is opened to disconnect the battery 206 from the circuit. In this mode, power flows from the battery 206 to the load, as shown by the arrow 256. In this example embodiment, the PV panel 202 (if present) can be selected to have a reverse blocking diode (not shown) in the array.

Furthermore, it is noted that the switch 204 beneficially allows for pre-charging the output filter 214 while in Mode 3, which is critical for prevention of over current conditions. While the switch 204 will allow for PWM operation to "softly charge" the output filter 214 of the buck regulator, shown as a point of common coupling (PCC), the switch 204 is to operate as a DC/DC converter while in operation Mode 3.

The multi-modal operation of the solar energy management system 200 can beneficially enable user familiarity "ramp up" over time. First, a user can operate the solar energy management system 200 without connecting a battery 206. During this type of use, the user can develop familiarity and comfort with the system. Next, as familiarity with the system advances, the user can incrementally add one or more batteries 206 to the system. Thus, the solar energy management system 200 beneficially can allow users to develop cognitive confidence over time and allow the user to utilize more sophisticated solar management techniques as their comfort level increases.

The solar energy management system 200 is flexible with regard to input power source. In this regard, the solar energy management system 200 can be powered up without requiring a battery 206 being attached to the system. This flexibility is provided by an auxiliary DC/DC converter, shown as a buck convertor 230 on a power board 212, which can process inputs from the PV panel 202 and inputs from the battery input 206. The power board 212 can perform a logical OR operation on both of these voltages, thereby allowing either power source to drive the control unit 208, as provide power to the plurality of outlets 234.

The solar energy management system 200 can allow for the arbitrary insertion of an energy storage device. Specifically, once a battery input is detected, the switch 204 can be controlled to either soft start the output filter capacitors 214 of a buck regulator 216, assuming they are of a low value with an input from a PV panel 202 not present. If the output filter capacitors 214 are charged, the switch 204 can be closed. The system can charge the output capacitors 214 appropriately when between these operational conditions.

In accordance with various embodiments, the solar energy management system 200 can allow for user protection in the various modes of operation. In particular, the conditions of overcurrent and undervoltage at the user load point, designated as output terminals 110 in FIGS. 2-5, can be protected for overcurrent and undervoltage irrespective of operational conditions.

Figure 6:
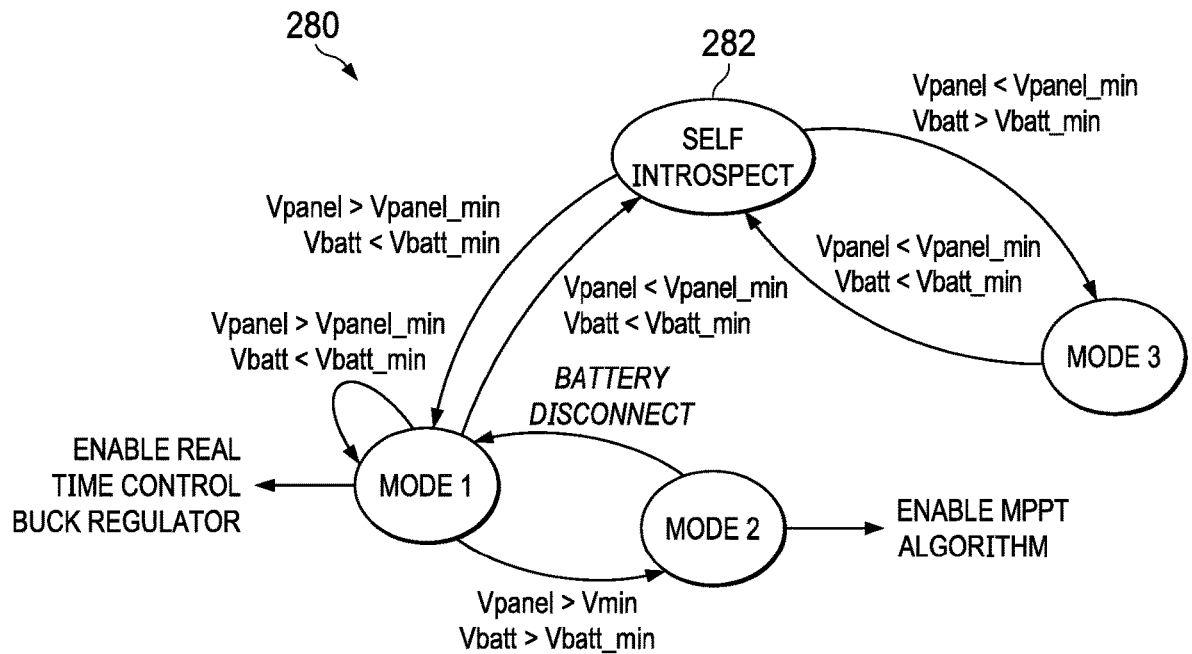
FIG. 6 is an example Finite State Machine diagram for a solar energy management system in accordance with one non-limiting embodiment.

Referring now to FIG. 6, a Finite State Machine diagram 280 for the solar energy management system 200 in accordance with one non-limiting embodiment is depicted. The operational modes of the solar energy management system 200 are depicted, with Mode 1 being a PWM operation (as also shown in FIG. 3A), Mode 2 being an MPPT operation (as also shown in FIG. 4A), and Mode 3 being standalone battery operation (as also shown in FIG. 5).

The self-introspect state 282 can be entered upon power up, as the control unit 208 is evaluating the hardware conditions. The result is a determination as to whether to transition to Mode 1, Mode 2, or Mode 3. Once operating in that mode, the state machine will vector to the next appropriate state.

While in Mode 1, the PV panel(s) 202 is energizing the solar energy management system 200 (Vpanel>Vpanel_min) and the voltage from the battery 206 is read as zero or not present (Vbatt<Vbatt_min), and the switch 204 remains open. The converter will run in DC/DC buck converter mode and produce a user programmed voltage at the output terminals 210. While in Mode 2, the user connects the PV panel 202 or the battery 206, and the power board 212 is energized to provide power to the control unit 208. It is noted that the sequence of the use connecting the PV module 202 and the battery 206 is non-determinative, which is a beneficial operational aspect of the solar energy management system 200. While in Mode 2, control unit 208 will perform MPPT tracking while maintaining the output voltage at the output terminals 210 at the level selected by the user, as long as Vpanel>Vmin and Vbatt>Vbatt_min. As shown in FIG. 4A, a difference in the firmware structure between Mode 1 and Mode 2 is the execution of the MPPT algorithm in Mode 2 will be running in software, and updating the current loop commands to the buck regulator. Mode 3 is generally similar as Mode 1, however the digital control algorithm for the buck regulator is turned OFF in the control unit 208. Mode 3 will be maintained as long as Vpanel<Vmin and Vbatt>Vbatt_min. In accordance with the present disclosure, the digital control algorithm can be any suitable control paradigm, such as a PID controller, a Model Reference Adaptive Controller (MRAC), a neural network, or any other suitable type of control algorithm.

Figure 7:
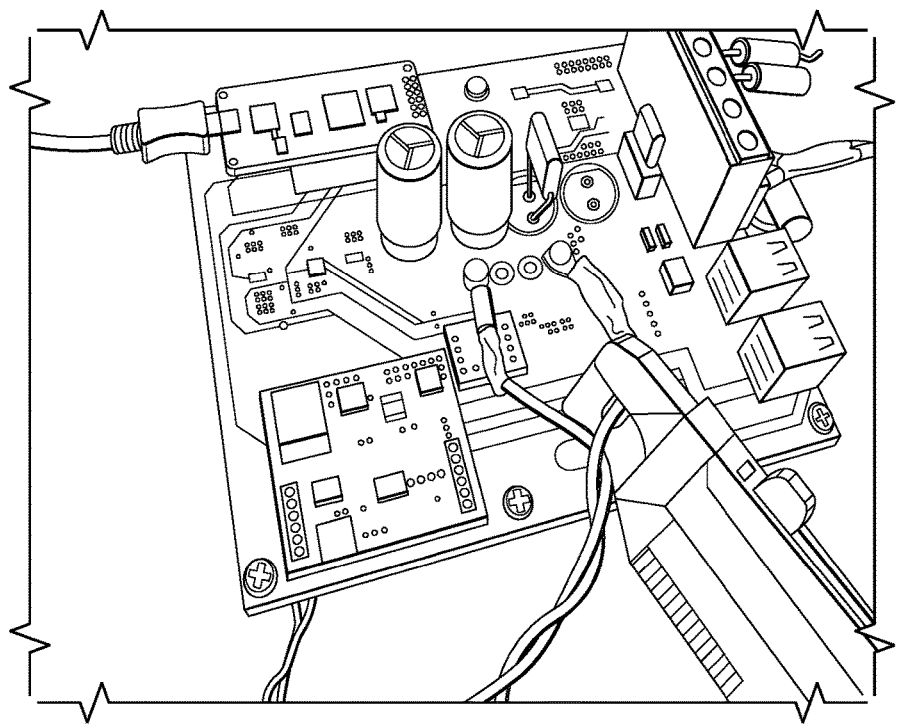
FIG. 7 is a photograph of a circuit board of an example solar energy management system in a test fixture.

Solar energy management systems in accordance can be provide in a variety of form factors in implementations. The control logic of the solar energy management can be provided by any suitable technique, such as via an Field Programmable Gate Array (FPGA), an Application-Specific Integrated Circuit (ASIC), a microcontroller, or a microprocessor. By way of example, FIG. 7 is a photograph of a circuit board of an example solar energy management system. As shown, the circuit board is removed from a housing and attached to a test fixture.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A solar energy management system, comprising:
a photovoltaic (PV) panel electrical coupling;
a battery storage electrical coupling;
at least one outlet;
at least one PV sensor and at least one battery sensor;
a switch;
a control unit in electrical communication with the switch, the at least one PV sensor, and the at least one battery sensor, wherein the control unit is configured to automatically open the switch or automatically close the switch based on signals received from the least one PV sensor and the at least one battery sensor.

2. The solar energy management system of claim 1, wherein the control unit is configured to selectively operate the solar energy management system in either a first operational mode, a second operational mode, or a third operational mode.

3. The solar energy management system of claim 2, wherein the first operational mode is a PWM controller mode.

4. The solar energy management system of claim 3, wherein the control unit is configured to operate in the PWM controller mode when the signal received from the at least one battery sensor indicate a battery voltage level is less than a minimum battery voltage threshold.

5. The solar energy management system of claim 2, wherein the second operational mode is a combined charge controller and a PWM DC/DC converter mode.

6. The solar energy management system of claim 5, wherein the control unit is configured to operate in the combined charge controller and a PWM DC/DC converter mode when PWM controller mode when the signal from the at least one battery sensor indicate a battery voltage level is greater than a minimum battery voltage threshold and the signal received from the at least one PV sensor indicate a panel voltage level is greater than a minimum panel voltage threshold.

7. The solar energy management system of claim 2, wherein the third operational mode is a charger controller mode.

8. The solar energy management system of claim 7, wherein the control unit is configured to operate in the charger controller mode when the signal received from the at least one PV sensor indicate a panel voltage level is less than a minimum panel voltage threshold and the signal received from the at least one battery sensor indicate a battery voltage level is greater than a minimum battery voltage threshold.

9. The solar energy management system of claim 1, where the at least one PV sensor comprises a first current sensor and a first voltage sensor.

10. The solar energy management system of claim 1, where the at least one battery sensor comprises a first current sensor and a first voltage sensor.

11. The solar energy management system of claim 1, comprising a Field Programmable Gate Array (FPGA), wherein the FPGA comprises the at least one PV sensor, the at least one battery sensor, the switch, and the control unit.

12. The solar energy management system of claim 1, comprising an Application-Specific Integrated Circuit (ASIC), wherein the ASIC comprises the at least one PV sensor, the at least one battery sensor, the switch, and the control unit.

13. A solar energy management system, comprising:
a photovoltaic (PV) panel electrical coupling;
a battery storage electrical coupling;
at least one outlet;
at least one PV sensor and at least one battery sensor;
a control unit in electrical communication with the switch, the at least one PV sensor, and the at least one battery sensor, and wherein the control unit comprises control logic to selectively operate the solar energy management system in a first operational mode, a second operational mode, or a third operational mode, wherein the first operational mode is a PWM controller mode, wherein the second operational mode is a combined charge controller and a PWM DC/DC converter mode, wherein the third operational mode is a charger controller mode.

14. The solar energy management system of claim 13, further comprising a first plurality of sensors in communication with the control unit and a second plurality of sensors.

15. The solar energy management system of claim 14, wherein the first plurality of sensors are to generate one or more signals based on a PV voltage level and a PV current level.

16. The solar energy management system of claim 15, wherein the second plurality of sensors are to generate one or more signals based on a battery storage voltage level and a battery storage current level.

17. A solar energy management method, comprising:
  detecting, by a control unit, operational conditions of a solar energy management system; and
  based on the detected operational conditions, automatically operating the solar energy management system in either a first operational mode, a second operational mode, or a third operational mode, wherein the first operational mode is a PWM controller mode, wherein the second operational mode is a combined charge controller and a PWM DC/DC converter mode, wherein the third operational mode is a charger controller mode.

18. The solar energy management method of claim 17, wherein detecting the operational conditions of a solar energy management system comprises measuring voltage and current levels being generated by a photovoltaic (PV) panel electrically coupled to the solar energy management system.

19. The solar energy management method of claim 18, wherein detecting the operational conditions of a solar energy management system comprises measuring voltage and current levels being generated by a battery storage electrically coupled to the solar energy management system.

20. The solar energy management method of claim 18, further comprising:
  based on the detected change in operational conditions, automatically switching one of the first operational mode, the second operational mode, and the third operational mode to a different one of the first operational mode, the second operational mode, and the third operational mode.

* * * * *